July 18, 1944. A. W. KINGSTON 2,354,029
MOLDING PRESS
Filed July 16, 1942 6 Sheets-Sheet 2
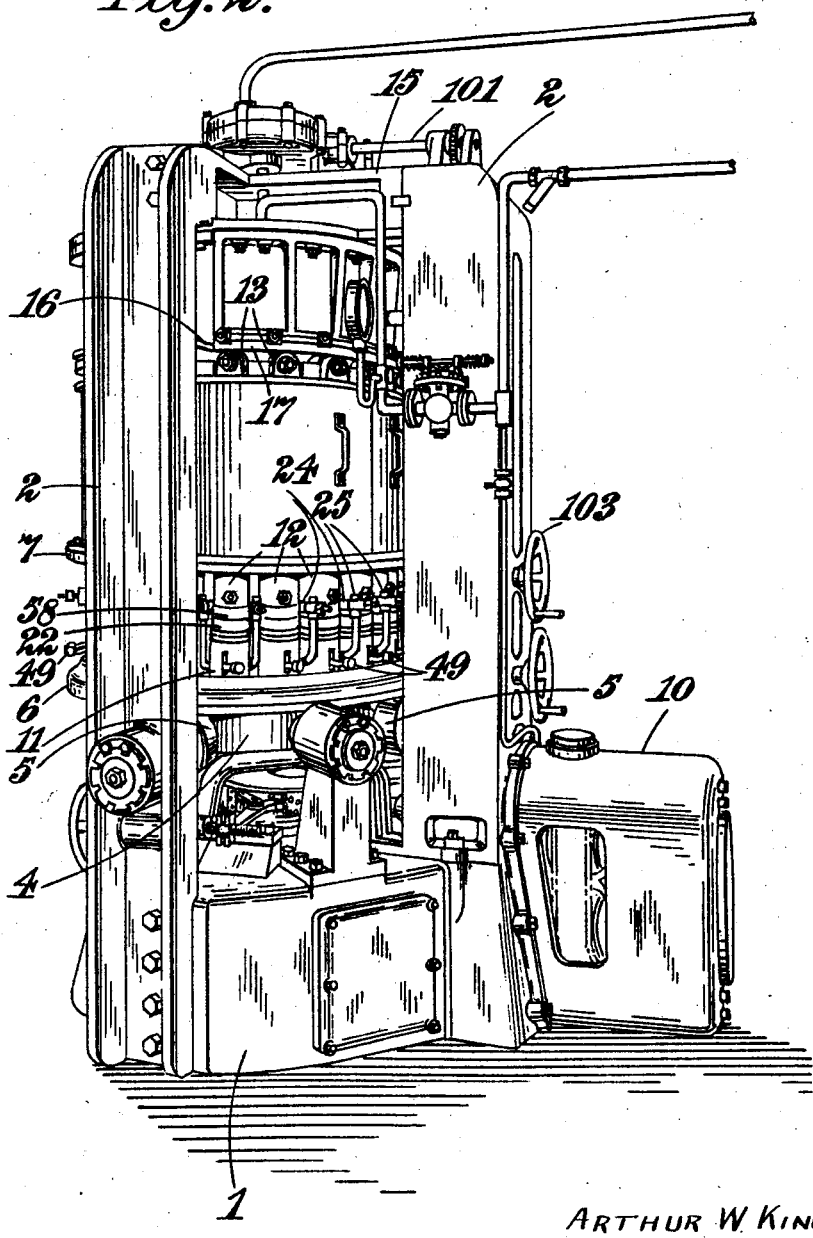

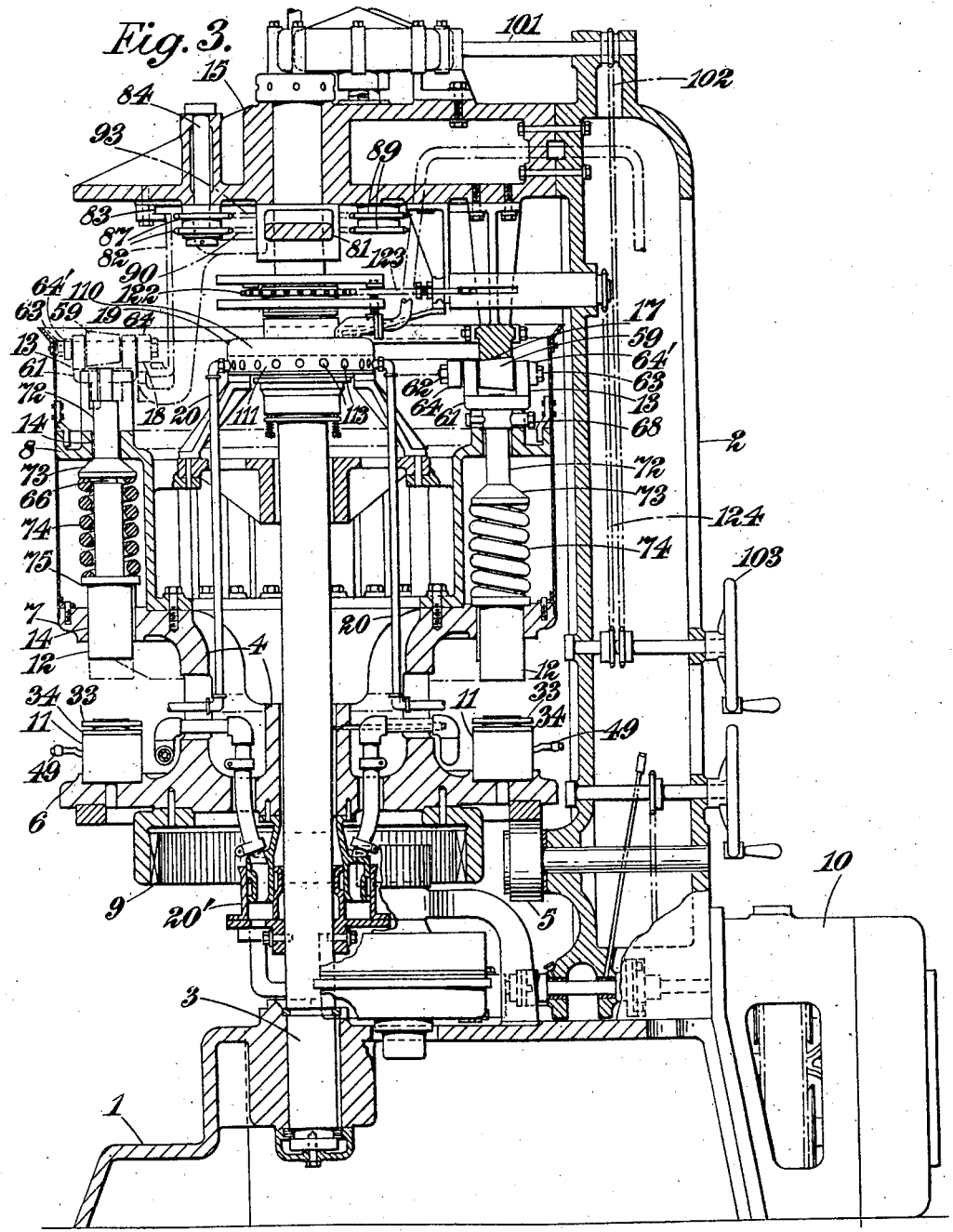

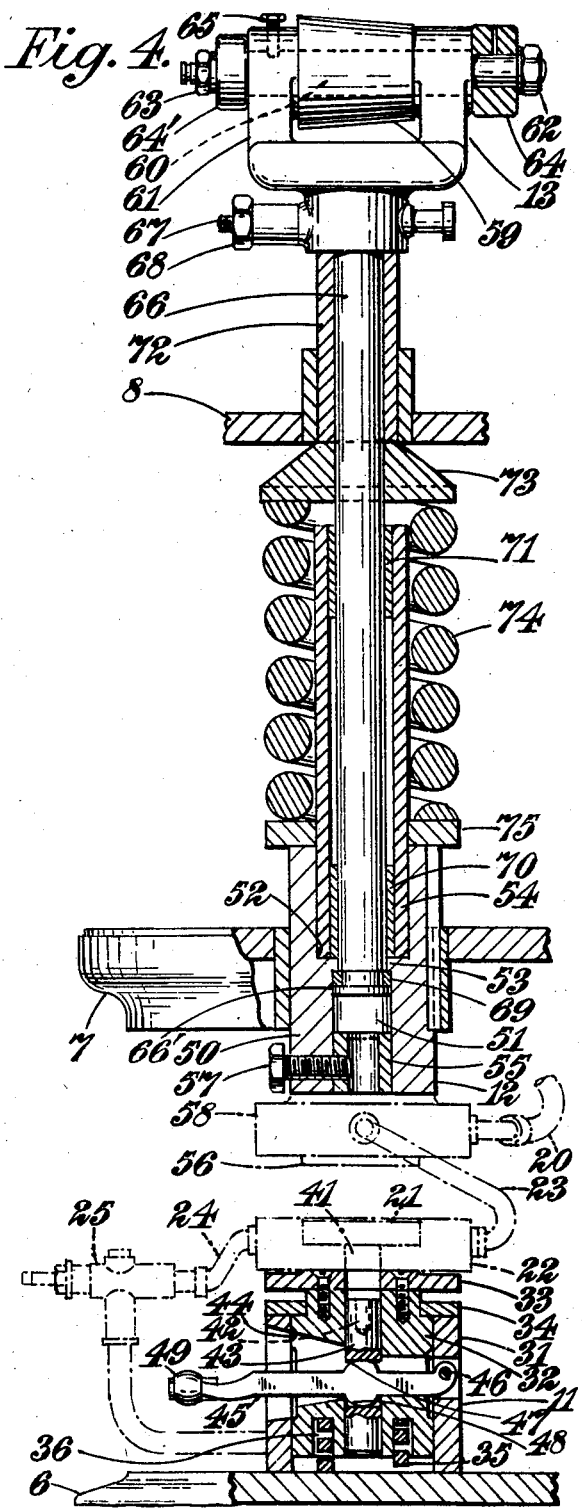

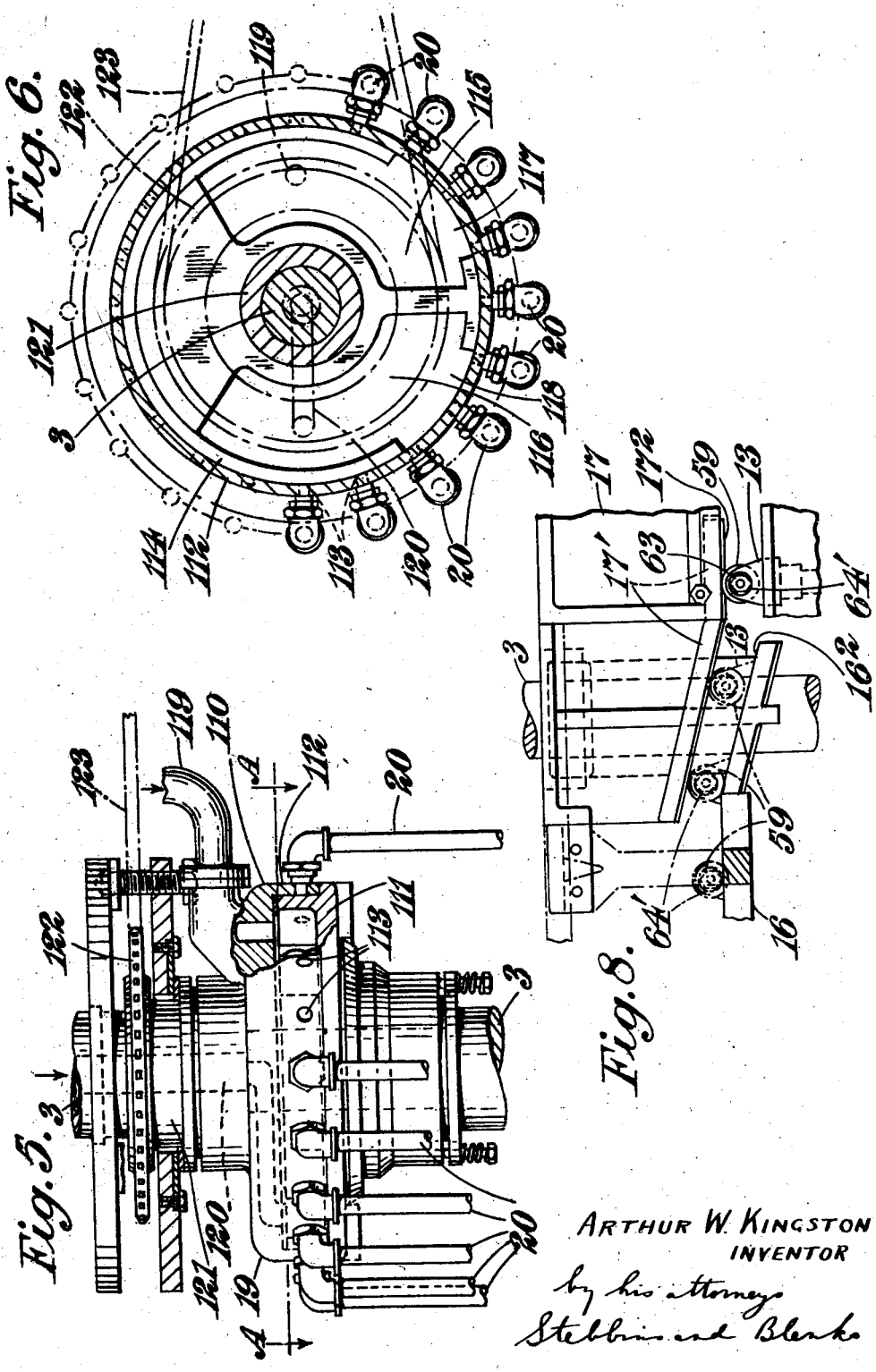

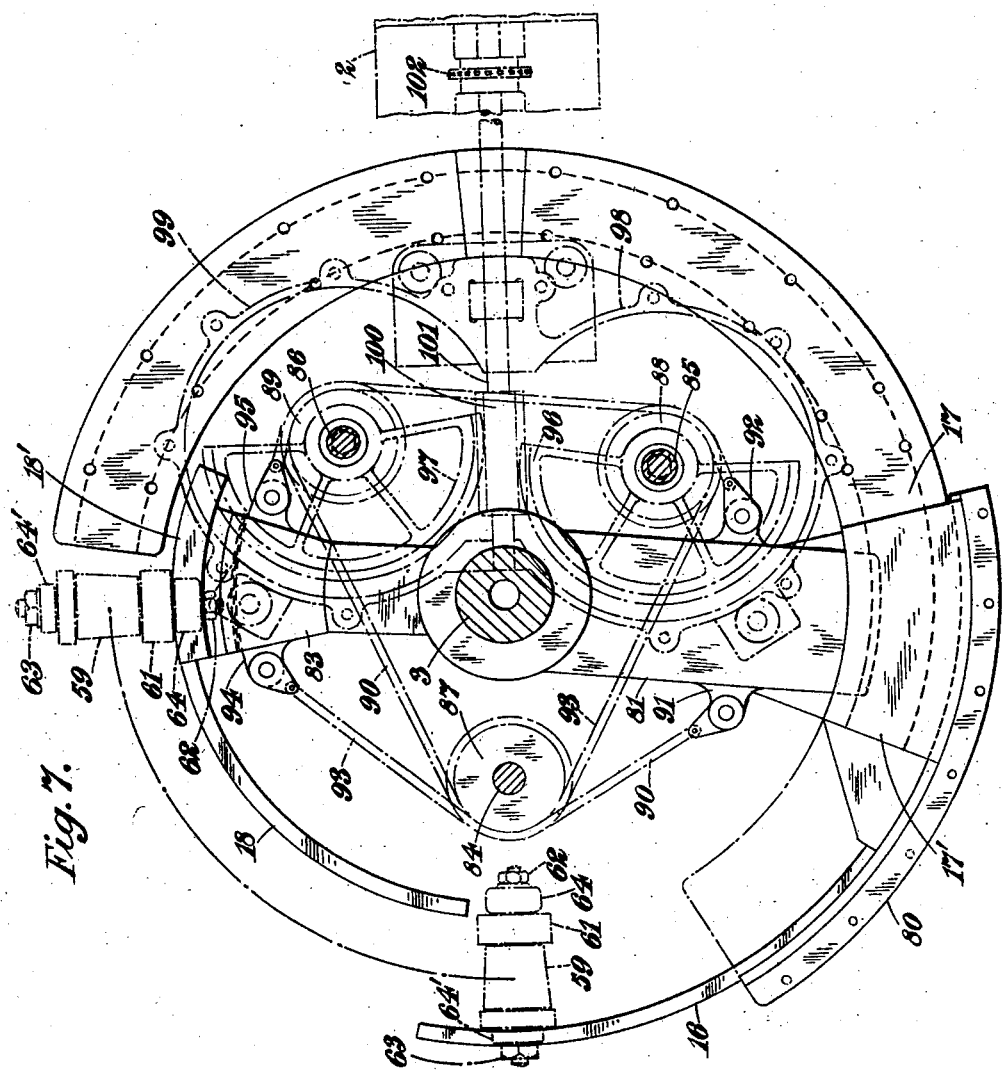

Patented July 18, 1944

2,354,029

UNITED STATES PATENT OFFICE 2,354,029

MOLDING PRESS

Arthur William Kingston, Denham, England

Application July 16, 1942, Serial No. 451,102
In Great Britain August 5, 1938

5 Claims. (Cl. 18—20)

This invention is for improvements in or relating to rotary table type molding presses and has for its object to provide such a press which is capable of high output and of adjustment to meet the conditions required for molding a variety of articles from plastic materials. Thus thermoplastic materials must be brought to their plasticising temperature before they can be shaped by dies, and the time taken to reach that temperature may vary with the precise nature of the material or the amount thereof to be shaped. For like reasons the period of molding under pressure may need to be varied. The invention therefore aims at providing a molding press in which the material may be pre-heated and the duration of such heating or that of the molding under pressure of both of those periods may be varied.

According to the present invention, the press has a plurality of reciprocable dies and co-operating molds each having jackets to which heating and cooling media are cyclically supplied and wherein each die in turn is first brought into light contact with the material in its co-operating mold to pre-heat the material, is then caused to exert a predetermined pressure on the heated material to shape it, and is finally withdrawn from contact with the material; means being provided for varying the duration of the pre-heating or the duration of shaping or of both of these periods.

The dies are carried by plungers which may be operated by coming successively into contact with a downwardly-inclined cam track leading to a horizontal cam track which may be adjustable as to length and terminating in an upwardly-inclined cam track and conveniently the duration of preliminary heating is varied by resiliently mounting the co-operating mold and adjusting the extent of movement thereof such that as the plunger moves down the inclined cam track its die comes into light contact with the material in the mold for a period determined by the extent of movement of the mold.

The duration of the molding under pressure is varied by altering the effective length of the horizontal cam track.

Preferably the heating and cooling of the dies and molds is effected by supplying fluid media to the jackets through a valve member rotatable with a carrier on which the dies are mounted and having at least one port communicating with each jacket and a co-operating stationary valve member for directing the fluid to each jacket in succession and the stationary valve member is capable of angular adjustment so as to vary the point of admission and cut-off of the fluid.

A specific embodiment of the present invention as applied to a press for molding thermoplastic material will now be described with reference to the accompanying drawings, in which:

Figure 2 is a view corresponding to Figure 1 but showing the rear of the press;

Figure 3 is a longitudinal section through the press;

Figure 4 is a longitudinal section through one of the plungers and co-operating mold;

Figure 5 is a view partly in section of the steam and cooling water distributor;

Figure 6 is a section on the line A—A of Figure 5;

Figure 7 is a sectional view showing the cam adjusting means; and

Figure 8 is a detail view showing the downwardly-inclined cam and the means for varying the length of the main cam.

Figure 1:
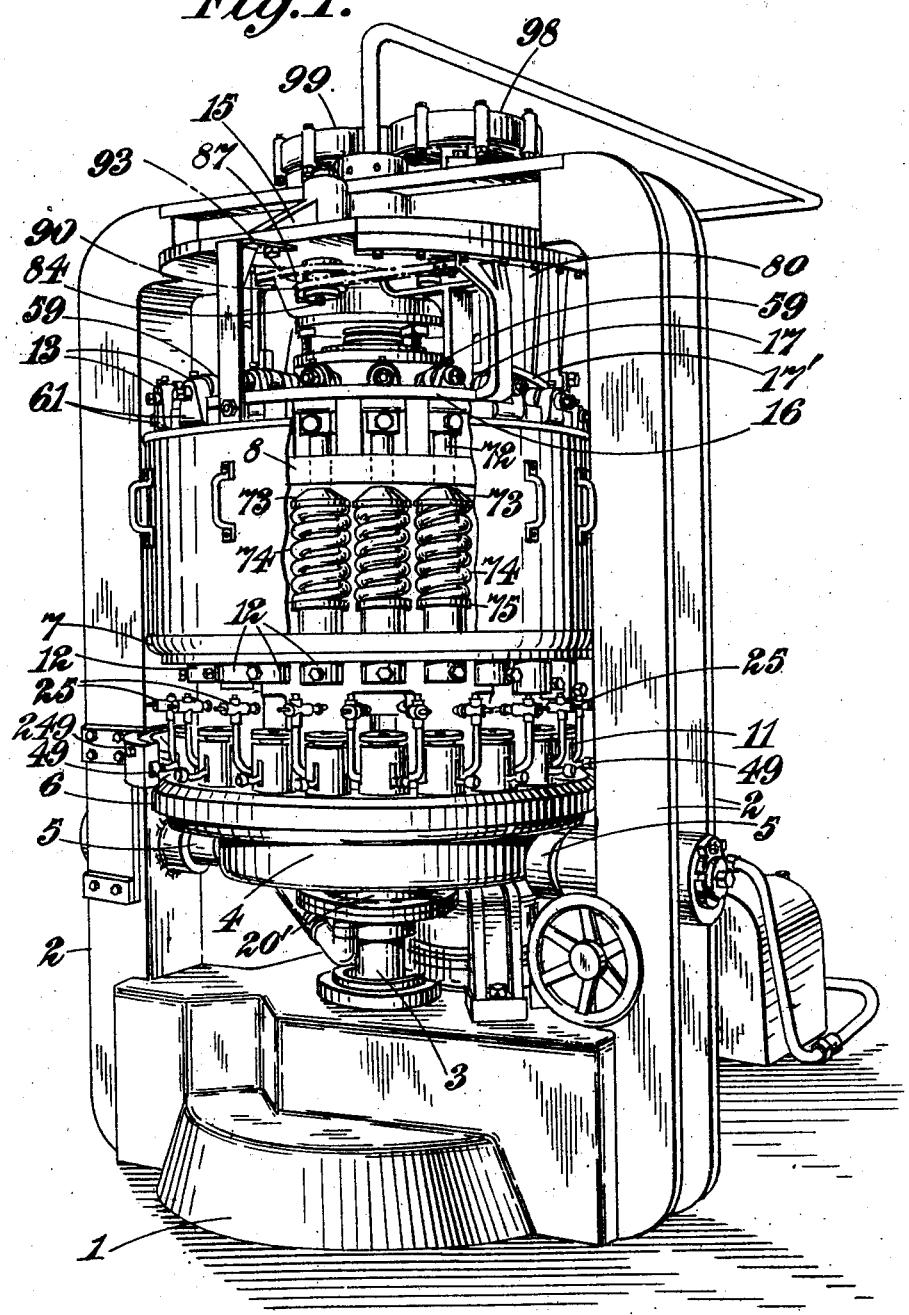
Figure 1 is an outside view of the press, in perspective with a portion broken away.

Referring to the drawings, the rotary press comprises a base 1 with three co-operating side supports 2 connected at their upper ends to form a cross frame 15 which supports the upper end of a fixed, central, vertical shaft 3 on which there is mounted a rotatable carrier 4. The carrier 4 is supported by three roller-bearings 5 each carried by one of the side supports 2. Two of these roller-bearings 5 may be capacle of vertical adjustment whereby the carrier 4 can be maintained in a horizontal plane. The carrier 4 is mounted near to the lower end of the central shaft 3 and is provided with three vertically spaced circular flanges 6, 7 and 8 extending laterally from the main body portion of the carrier. The lowermost flange 6 carries on its underside an internally-toothed ring 9 which is driven by a motor 10 through a suitable gear train (not shown) which train preferably includes suitable control means, for example, a centrifugal governor capable of adjustment to vary the speed of the carrier within desired limits, for example between one revolution in 3 minutes and one revolution in 15 minutes.

On its upper surface, the flange 6 supports a plurality of molds 11, say twenty in number, spaced equidistantly around the circumference of the flange 6 on the upper surface thereof. These molds 11 co-operate with a corresponding number of die carrying plungers 12 which with connected followers 13 are supported by the flanges 7 and 8. The flanges 7 and 8 are provided with circumferentially-spaced holes 14 through which the plunger and followers respectively pass.

Secured to the fixed cross frame 15 of the press, which connects the upper ends of the side supports 2 above the carrier 4, are three arcuate cam-tracks 16, 17 and 18. The cam tracks 16 and 18 are supporting tracks whilst the track 17 is a depressing track for the purpose of bringing the die carried by the plungers to their operative position. The followers 13, as more fully described hereinafter, are provided with rollers adapted to co-operate with the tracks 16 and 18 to support the plungers whilst they are inoperative and with the track 17 to depress them when they are operative. The followers are guided from the supporting cam track 16 and urged down to the under-side of the cam track 17 by a downwardly-inclined cam track 17¹. This cam track 17¹ is, as more fully described later, mounted for adjustment and has an extension 17² which normally overlaps the cam track 17 as may be seen in Figure 8. On the cam track 17¹ being moved away from the end of the cam track 17, its extension 17² forms a prolongation of the cam track 17. By such adjustment the effective length of the cam track 17 may be varied. The followers 13 are elevated from their depressed position by means of an upwardly-inclined cam track leading to the upper surface of the supporting cam track 18. This upwardly-inclined track together with the cam 18 is adjustable as more fully described hereafter to adjust the point at which the followers are elevated and the plungers lifted out of contact with molds. Thus as the carrier 4 rotates the plungers are successively depressed whilst traversing the downwardly-inclined cam track 17¹, and brought to fully lowered position in which they are maintained for the molding operation whilst traversing the cam track 17, and then raised fully to inoperative position by the upwardly-inclined cam track to be supported by the cam track 18.

The carrier 4 also supports part of a distributor 19, hereinafter more fully described, for steam for heating and cooling water and also delivery conduits 20 which lead from the distributor to jackets surrounding the molds 11 and thence to a collector 20¹ mounted below the carrier 4.

The construction of the molds 11 and of the co-operating plungers 12 is shown more particularly in Figure 4 of the drawings. Each mold 11 comprises a molding die 21 having a jacket 22 in which it seats, the jacket 22 being equipped with a steam and cooling water supply pipe 23 and a corresponding delivery or exhaust pipe 24 whereby the jacket and thence the die can be heated and then cooled over desired portions of the molding cycle. A steam trap 25 is provided in the delivery or exhaust pipe-line 24. In order to facilitate removal of the molding die 21 with the molded article after the molding operation there is provided an ejector mechanism which is later described in detail and is disposed in the lower part of the molds. The molding die 21 and associated jacket 22 are resiliently mounted in a support which comprises a cylindrical outer casing 31 within which there is accommodated a spring-loaded member 32 capable of limited axial movement with respect to the casing 31. At its upper part the member 32 protrudes out of the casing 31 to terminate in a flange 33 screwed thereto on which is mounted the jacket 22. The flange 33 co-operates with an annular ring 34 on the casing 31 to limit the movement thereof. Normally the flange 33 is urged to a limited distance away from the ring 34 by the loading spring 35 which is mounted in an annular recess 36 in the lower part of the member 32 with the lower end of the spring abutting against the surface of the carrier flange 6. The extent of this movement is limited by a portion of larger diameter of the member 32 engaging the ring 34 whilst movement in the opposite direction is limited by the flange 33 abutting the ring 34. The extent of the former movement may be varied by providing a washer around the portion of smaller diameter of the member 32 whilst the latter movement may be varied by replacing the ring 34 with another of different thickness or by means of a washer as may be most convenient. The extent of permissible travel of the die 21 governs the period of preliminary heating of the material in the die as is explained hereinafter.

The die jacket 22 and the member 32 are bored centrally and in the continuous bore thus formed there is accommodated a solid ejecting member 41 of the molding die 21 which member terminates in a pin 42 seating in a recess provided in a piston 43 slidable in the member 32. The piston 43, the member 32 and the casing 31 are provided with a lateral slot 44 and in this slot a lever 45 is mounted, the lever being pivoted at 46 to the casing 31. The portion of the lever 45 which extends into the slot in the piston 43 has semi-circular cam-surfaces 47, 48 which engage the walls of the slot therein such that pivotal movement of the lever 45 brings about longitudinal movement of the piston 43 with consequent movement of the ejector 41. The free end of the lever 45 carries a roller 49. As the carrier 4 moves round the rollers 49 successively enter, on conclusion of the molding operation, a recess in an arcuate member 249 (Figure 1) which recess is appropriately shaped and serves as a cam track functioning to rock the lever 45 to move the piston 43 and bring about ejection of the shaped articles from the molds.

The plungers 12 (Figure 4) each comprise a sleeve 50, passing through the carrier flange 7 and bored axially from both ends, the diameter of the lower bore 51 being less than that of the upper bore 52 with which it communicates by way of a hole of slightly smaller diameter than the bore 51, thereby forming an internal flange or annulus 53. Fitting in the bore 52 to abut against the flange 53 is an upwardly-extending inner sleeve 54. Within the lower bore 51 fits an extension 55 of a molding die 56 intended for co-operation with the die 21 to form moldings to the required shape. The die extension 55 is detachably secured by means of a screw 57. A jacket 58 surrounds the die 56 and is connected to the main steam and cooling water conduit 20 and also to the jacket 22 by the pipe 23; thus the two jackets are connected in series by the pipe 23 forming the delivery or exhaust pipe of the jacket 58 and the supply pipe of the jacket 22.

The follower 13 consists essentially of a roller 59 mounted for free rotation upon a fixed shaft 60 which is secured in a cradle 61 by nuts 62, 63. Auxiliary rollers, 64, 64¹ are also mounted for free rotation on this shaft 60 between one arm of the cradle 61 and the nuts 62, 63 respectively. Rotation of the shaft 60 is prevented by a screw 65 entered into a tapped hole in the cradle 61 and passing into a blind hole in the shaft 60. The base of the cradle 61 is bored to receive a vertical rod 66 retained by a cross-bolt 67 which is secured by a nut 68. The vertical rod 66 extends downwardly through the inner sleeve 54 of the plunger 12 into the bore 51 and has an end flange or head 66¹ between which and the flange or annulus 53 there is a distance piece 69. The rod 66 is spaced from the inner sleeve 54 and is guided for movement by two bushes 70 and 71 secured to the sleeve 54 at or near the ends thereof. Surrounding the upper part of the rod 66 is an extension 72 of the cradle 61, which extension passing through the carrier flange 7 has a conical end flange 73. A strong compression spring 74 is located between the flange 73 and a face-plate 75 secured to the upper end of the sleeve 50 of the plunger, with the spring surrounding the sleeve 54. With the plunger 12 in its inoperative position, there is a predetermined distance between the flange 73 and the upper end of the sleeve 54 as may be seen in Figure 4. On the follower 13 imparting movement to the assembly, it moves bodily downward until such time as the die 56 engages the die 21 or the material therein and the movement thereof is resisted thereby as when the resilience of the mold mounting is taken up. There is now a relative movement between the sleeve 50 and the rod 68 as the spring 74 is compressed between the conical end flange 73 and the face plate 75, and the head 66¹ of the rod 66 slides in the bore 51.

As already mentioned, the plunger followers 13 are actuated by the three cam tracks 16, 17 and 18 secured to the stationary frame of the press and the two inclined cam tracks 17¹ and 18¹. Figures 7 and 8 best show the disposition of the tracks. The cam-track 16 co-acts with the auxiliary rollers 64¹, and the cam tracks 18 and 18¹ with the auxiliary rollers 64 while the cam tracks 17 and 17¹ co-act with the main roller 59. The track 16 serves to maintain the plungers 12 in the fully raised position for a predetermined period of the rotation of the carrier 4, during which time the rollers 64¹ run along the upper surface of the track 16. The carrier 4 moves in an anticlockwise direction as seen in Figure 7 and it will be seen from Figure 8 that, when each roller 64¹ leaves the track 16, the corresponding main roller 59 passes beneath the downwardly-inclined cam track 17¹ forming the entry portion of the cam track 17. During part of this movement down the cam track 17¹, the plungers 12 are moved downwardly first to dwell for a short period in light contact with the molds 11 or the material therein for the purpose hereinafter described. At the end of the movement down the cam track 17¹, the plungers are at their lowermost position with their dies in high pressure contact with the molds 11, which position is maintained during the molding operation proper by the cam track 17. When the rollers 59 approach the end of the cam track 17, the auxiliary rollers 64 ride up on the upwardly-inclined cam track 18¹ and on to the track 18, lifting the plungers 12 to the fully raised position. After a period of horizontal travel of the rollers 64 on the track 18, the rollers 64¹ reach the horizontal track 16 and travel on this for the remainder of the cycle.

In order to adapt the press to different periods of molding, the period during which the plungers 12 are lowered can be varied by altering the effective length of the cam track 17 as described above by displacing the downwardly-inclined cam track 17¹. For this purpose the cam track 17¹ is carried by an arm 80 which is bolted to a displaceable plate 81. In a similar manner, the cam track 18 with its upwardly-inclined cam track 18¹ is carried by a segmental arm 82 bolted to a slidable plate 83. The plates 81 and 83 are mounted upon the fixed shaft 3.

Extending through the cross-head 15 of the press frame are three stub shafts 84, 85 and 86 mounted for rotation. At their lower ends, these shafts carry pairs of pinions 87, 88 and 89 respectively. One driving chain 90 is connected at its ends to either side of the plate 81, extending from a lug 91 around the lower pinion 87, thence around the lower pinion 89 and the lower pinion 88 to a lug 92. Another driving chain 93 is connected at its ends to either side of the plate 83, extending from a lug 94, around the upper pinions 87, 88 and 89 thence to a lug 95. The upper pinion 88 and the lower pinion 89 are driven while the two pinions 87, the lower pinion 88 and the upper pinion 89 turn freely. For actuating the upper pinion 88 and the lower pinion 89, the respective shafts 85 and 86 carry at their upper ends segmental racks 96, 97 housed in casings 98 and 99 (Figure 1), which racks are operated by a worm 100 mounted on a driven shaft 101 (Figure 7). The shaft 101 is rotated manually through a driving chain 102 (Figure 3) which extends vertically within the support 2 at the back of the press, an operating handle 103 being provided for the purpose. In this way, adjustment of the relative positions of the tracks 17 and 18 is readily effected.

The steam and cooling water distributor 19 is shown more particularly in Figures 5 and 6. It comprises a cylindrical outer casing 110 mounted on the shaft 3 for rotation with the carrier 4. Spaced around the periphery of, and communicating with the interior of, the casing 110 are the distributor pipes 20. Fitting within the casing 110 is a flanged plate 111 having a fluid-tight fit therewith. The side wall 112 of the casing 110 has a plurality of spaced ports 113 equal in number and spacing to the pipes 20 and communicating therewith. The flange 114 on the plate 111 is shaped to provide two separate chambers 115 and 116 respectively which communicate at any time with a limited number of the ports 113 through ports 117 and 118. One of the chambers 115, 116 is supplied with steam through a pipe 119 while the other is supplied with cooling water through the pipe 120. The points of application of heating and cooling relative to the application pressure in the molding cycle are controllable for which purpose the plate 111 is secured on a shaft 121 which in turn is mounted for rotation on the shaft 3. The shaft 121 extends upwardly through the casing 110 and carries a pinion 122 around which a driving chain 123 passes. The drive for the chain 123 is not shown in detail; it is transmitted from the operating handle 103 through a further chain 124 (Figure 3). By synchronously operating, through the common operating handle 103, the means for altering the points of heating and cooling with the means for varying the commencement of the pressure, it is possible to ensure that the heating will occur always at a point in predetermined relation to the point of application of pressure.

Describing now the operation of the press, from the initial position when the follower 13 of a plunger is supported on the cam track 16 by its roller 64¹, as the carrier 4 rotates the roller 64¹ leaves the end of the cam track 16 but is prevented from falling by the downwardly-inclined extension 16². Further rotation of the carrier brings the main roller 59 into engagement with the downwardly-inclined cam track 17¹. As the roller 59 is progressively depressed by the cam track 17¹, the plunger assembly 12 is moved bodily downwards and eventually the die 56 contacts with the die 21 or the material therein. This contact is quite light and is maintained in spite of further downward movement of the plunger assembly due to the resilient mounting of the die 21, the period of this light contact being governed by the extent of permissible movement of the member 32 limited by the flange 33 contacting the ring 34.

During this part of the operation steam is supplied to the jackets 58 and 22 and the dies are heated and the heat transferred to the material in the die 21 to soften it and bring it to appropriate plastic condition for shaping when the dies are more strongly pressed together. The period necessary for the heating of the material will vary with the nature of the material or the amount thereof in the die and this period of heating may be altered by varying the extent of movement of the resilient mounting of the die 21 as already described.

On leaving the inclined cam track 17¹, the roller 59 rides on to the underside of the cam surface 17. At the end of its travel down the cam track 17¹, at the point when permissible movement of the die 21 has been taken up, the full pressure is applied and during the application of that pressure the rod 66 is moved relatively to the sleeve 50 against the action of the spring 74. The full molding pressure is therefore applied through the medium of this spring 74 and any disadvantages which might accrue through a rigid plunger assembly are thereby avoided.

After a period of molding with the dies heated, the steam is cut off by the means previously described and a cooling medium is caused to circulate through the jackets 58 and 22 to cool the dies and cause the material to set to the shape defined thereby. The means for varying the commencement and ending of the heating period have already been mentioned. In some cases it is desirable to maintain the dies in contact for a longer period when the effective length of the cam track 17 is increased by a displacement of the cam track 17¹ so that the extension 17² operates independently of the rest of the cam track 17 as a prolongation of the latter.

On conclusion of the molding operation, the inclined cam track 18¹ engages the roller 64 and causes upward movement of the follower 13 and the plunger assembly to lift the die 56 clear of the die 21. After riding up the inclined cam track 18¹ the roller 64 rides on to the cam track 18 and the plunger assembly is supported thereby until the support is taken over by the roller 64¹ riding on the cam track 16. As the mold moves round, after completion of the molding operation, the roller 49 on the end of the lever 43 enters the recessed cam track in the member 249 whereby the lever 45 is caused to rock and reciprocate the piston 43 and the ejector 41 to eject the shaped article from the die 21.

The temperature of the heating of the dies and the rapidity of the cooling may be governed in the one case by the temperature of the steam and in the latter by the temperature of the cooling medium which may be water at atmospheric or lower temperature.

The invention can be applied to the molding of articles from thermosetting material as well as from thermoplastic material, on suitable modification in constructional detail being made.

I claim:

1. In a rotary molding press for thermoplastic materials the combination of a stationary frame, a rotary member mounted on said frame, a plurality of molding units on said rotary member each of said units comprising a reciprocable jacketed die and a resiliently mounted jacketed mold co-operating with said die, a valve-member rotatable with said rotary member and having at least one port connecting with each jacket pair associated with a molding unit, a second valve-member on said stationary frame co-operating with said first-mentioned valve member for directing first heating and then cooling media to the jackets of said units successively, means for angularly adjusting said second-mentioned valve-member for varying the cyclic points of admission and cut-off of said media, together with cam-track means on said stationary frame co-acting with said dies to cause light pressure to be applied on initial contact between said dies and the material to be molded disposed in said molds so as to preheat said material, then to hold said dies engaged with said molds at molding pressure, and at the end of the molding operation to remove said dies out of contact with said molds.

2. In a rotary molding press for thermoplastic materials, the combination of a stationary frame, a rotary member mounted on said frame, means for rotating said rotary member, a plurality of molding units mounted on said rotary member each unit comprising a reciprocable jacketed die and a resiliently mounted co-operating jacketed mold, adjustable valve means for varying the points of application first of heating and then of cooling media sequentially to the jackets of said reciprocable dies and said co-operating molds, cam track means on said stationary frame having an inclined portion for successively lifting said reciprocable dies and a flat portion for supporting them out of contact with the molds during a predetermined extent of rotation of the rotary member, co-operating cam track means having an inclined portion for bringing said reciprocable dies into initial light contact with said co-operating molds whilst taking up permissible movement thereof due to their resilient mounting and a flat portion for holding said dies in molding engagement with said molds, means for varying the length of said co-operating cam track means to vary the point of application of the molding engagement and hence the duration of molding, and means for simultaneously adjusting said valve means and said length varying means of said co-operating cam track means.

3. In a rotary molding press for thermoplastic materials, the combination of a stationary frame, a rotary member mounted on said frame, means for rotating said rotary member, a plurality of molding units mounted on said rotary member each unit comprising a jacketed mold and a jacketed die capable of limited movement under spring control relative to a reciprocably mounted member, adjustable valve means for varying the points of application first of heating and then of cooling media sequentially to the jackets of said reciprocable dies and said co-operating molds, cam track means on said stationary frame having an inclined portion and a flat portion, means on said reciprocable members for engagement by said cam track to reciprocate said members to lift the dies carried thereby and support them out of contact with the molds during a predetermined extent of rotation of the rotary member, co-operating cam track means having an inclined portion and a flat portion, means for varying the length of the flat portion of said co-operating cam track means, and means on said reciprocable members for engagement by said co-operating cam track means to urge said members towards said molds to bring the dies carried thereby initially into light engagement with said molds and thereafter hold them in pressure engagement therewith.

4. In a rotary molding press for thermoplastic materials, the combination of a stationary frame, a rotary member mounted on said frame, means for rotating said rotary member, a plurality of molding units mounted on said rotary member each unit comprising a reciprocable jacketed die and a resiliently mounted co-operating jacketed mold, a valve-member rotatable with said rotary member and having at least one port connecting with each jacket pair associated with a molding unit, a second valve-member on said stationary frame co-operating with said first-mentioned valve member for directing first heating and then cooling media to the jackets of said units successively, means for angularly adjusting said second-mentioned valve-member for varying the cyclic points of admission and cut-off of said media, cam track means on said stationary frame having an inclined portion for successively lifting said reciprocable dies and a flat portion for supporting them out of contact with the molds during a predetermined extent of rotation of the rotary member, co-operating cam track means having an inclined portion for bringing said reciprocable dies into initial light contact with said co-operating molds and a flat portion for holding said dies in molding engagement with said molds, angularly adjustable means for varying the length of the flat portion of said co-operating cam track means, and means for simultaneously adjusting the angularity of said second valve member and of said length varying means of said co-operating cam track means.

5. In a rotary molding press for thermoplastic materials, the combination of a stationary frame, a rotary member mounted on said frame, means for rotating said rotary member, a plurality of molding units mounted on said rotary member each unit comprising a resiliently mounted jacketed mold and a jacketed die capable of limited movement under spring control relative to a reciprocably mounted member, a valve-member rotatable with said rotary member and having at least one port connecting with each jacket pair associated with a molding unit, a second valve-member on said stationary frame co-operating with said first-mentioned valve member for directing first heating and then cooling media to the jackets of said units successively, means for angularly adjusting said second-mentioned valve-member for varying the cyclic points of admission and cut-off of said media, cam track means on said stationary frame having an inclined portion and a flat portion, means on said reciprocable members for engagement by said cam track to reciprocate said members to lift the dies carried thereby and support them out of contact with the molds during a predetermined extent of rotation of the rotary member, co-operating cam track means having an inclined portion and a flat portion, angularly adjustable means for varying the length of the flat portion of said co-operating cam track means, means on said reciprocable members for engagement by said co-operating cam track means to urge the dies carried thereby towards said molds to take up the resilience of their mountings and thereafter hold them in pressure engagement therewith, and means for simultaneously adjusting the angularity of said second valve member and of said length varying means of said co-operating cam track means.

ARTHUR WILLIAM KINGSTON.